United States Patent [19]

Christianson

[11] Patent Number: 5,163,786
[45] Date of Patent: * Nov. 17, 1992

[54] CYCLONE SEPARATOR WITH FILTER ASSEMBLY FOR PNEUMATIC CONVEYOR

[75] Inventor: Roy O. Christianson, Blomkest, Minn.

[73] Assignee: Christianson Systems, Inc., Blomkest, Minn.

[ * ] Notice: The portion of the term of this patent subsequent to Dec. 19, 2006 has been disclaimed.

[21] Appl. No.: 728,043

[22] Filed: Jul. 6, 1991

Related U.S. Application Data

[63] Continuation of Ser. No. 220,015, Jul. 15, 1988, abandoned, which is a continuation-in-part of Ser. No. 85,394, Aug. 12, 1987, Pat. No. 4,887,936.

[51] Int. Cl.$^5$ .................. B65G 53/60; B65G 53/40
[52] U.S. Cl. .................. 406/41; 406/109; 406/171; 406/172; 406/173; 55/293; 55/312; 55/337; 55/467
[58] Field of Search ............. 406/41, 170-173, 406/168, 169, 109, 122, 175, 65, 67, 68, 181-183; 209/144; 55/312, 293, 294, 295, 337, 467, 325, 328, 413

[56] References Cited

U.S. PATENT DOCUMENTS

| D. 271,105 | 10/1983 | Christianson et al. | D15/10 |
|---|---|---|---|
| 525,389 | 9/1894 | Lee . | |
| 1,126,692 | 2/1915 | Blanchette . | |
| 1,686,877 | 10/1928 | Peik | 406/122 X |
| 1,811,597 | 6/1931 | Steinbart . | |
| 2,230,425 | 2/1941 | Finnegan | 406/109 X |
| 2,622,341 | 12/1952 | Finnegan | 406/109 X |
| 2,670,723 | 3/1954 | Clarkson | 122/379 |
| 2,837,377 | 6/1958 | Finnegan | 406/109 X |
| 2,918,139 | 12/1959 | Silverman | 183/81 |
| 2,937,713 | 5/1960 | Stephenson et al. | 183/89 |
| 2,946,626 | 7/1960 | Atkinson et al. | 406/172 X |
| 3,077,365 | 2/1963 | Fisher | 302/28 |
| 3,129,980 | 4/1964 | Kiesbar et al. | 406/109 X |
| 3,155,431 | 11/1964 | Baldwin | 406/65 X |
| 3,200,568 | 8/1965 | McNeil | 55/191 |
| 3,210,127 | 10/1965 | Schaben et al. | 406/173 X |
| 3,288,300 | 11/1966 | Bouchillon | 210/512 |
| 3,418,118 | 9/1969 | Willis et al. | 55/338 |
| 3,583,910 | 6/1971 | Stoddard | 210/46 |
| 3,590,558 | 7/1971 | Fernandes | 55/338 |
| 3,771,290 | 11/1973 | Stethem | 55/205 |
| 3,802,570 | 4/1974 | Dehne | 210/304 |
| 3,822,533 | 7/1974 | Oranje | 55/394 |
| 3,877,904 | 4/1975 | Lowrie | 55/392 |
| 3,885,933 | 5/1975 | Putney | 55/397 |
| 3,960,734 | 6/1976 | Zagorski | 210/512 M |
| 3,992,177 | 11/1976 | Welteroth | 55/337 X |
| 4,149,861 | 4/1979 | Sogo et al. | 55/261 |
| 4,159,151 | 6/1979 | Wood | 406/162 |
| 4,433,946 | 2/1984 | Christianson et al. | 406/109 X |
| 4,482,367 | 11/1984 | Howeth | 406/172 X |
| 4,503,786 | 3/1985 | Tautfest | 406/68 X |
| 4,572,726 | 2/1986 | Van Abbema | 55/337 |
| 4,580,928 | 4/1986 | Van Abbema | 406/109 |
| 4,599,016 | 7/1986 | Medemblik | 406/173 X |
| 4,673,423 | 6/1987 | Yumlu | 55/319 |
| 4,701,080 | 10/1987 | van Aalst | 406/109 |
| 4,702,893 | 10/1987 | Kirk et al. | 422/173 |
| 4,731,101 | 3/1988 | Kanda | 55/325 X |
| 4,885,012 | 12/1989 | Thompson | 406/173 X |
| 4,887,936 | 12/1989 | Christianson et al. | 406/173 X |
| 4,913,597 | 4/1990 | Christianson et al. | 406/171 X |

FOREIGN PATENT DOCUMENTS

| 206180 | 5/1955 | Australia . | |
| 834636 | 2/1952 | Fed. Rep. of Germany . | |
| 2065608 | 8/1974 | Fed. Rep. of Germany . | |
| 187079 | 1/1937 | Switzerland . | |
| 7552 | of 1910 | United Kingdom . | |
| 2194208 | 3/1988 | United Kingdom . | |
| 8200451 | 2/1982 | World Int. Prop. O. | 406/109 |

Primary Examiner—Russell D. Stormer
Assistant Examiner—James M. Kannofsky
Attorney, Agent, or Firm—Merchant, Gould, Smith, Edell, Welter & Schmidt

[57] ABSTRACT

A cyclone separator (20) for a pneumatic grain conveyor (10) includes a filter assembly (60) mounted in the upper end thereof. The filter assembly (60) includes a cylindrical casing (62) extending into the separator (20) with a screen (70) therein and an adjustable accelerator plate (84) which cleans an adjacent portion of the screen and distributes the collected dust and foreign particles on the remainder of the screen. A second filter assembly (90) is preferably connected between the air outlet of the separator (20) and air inlet of the blower (52) for further dust and foreign particle removal.

3 Claims, 4 Drawing Sheets

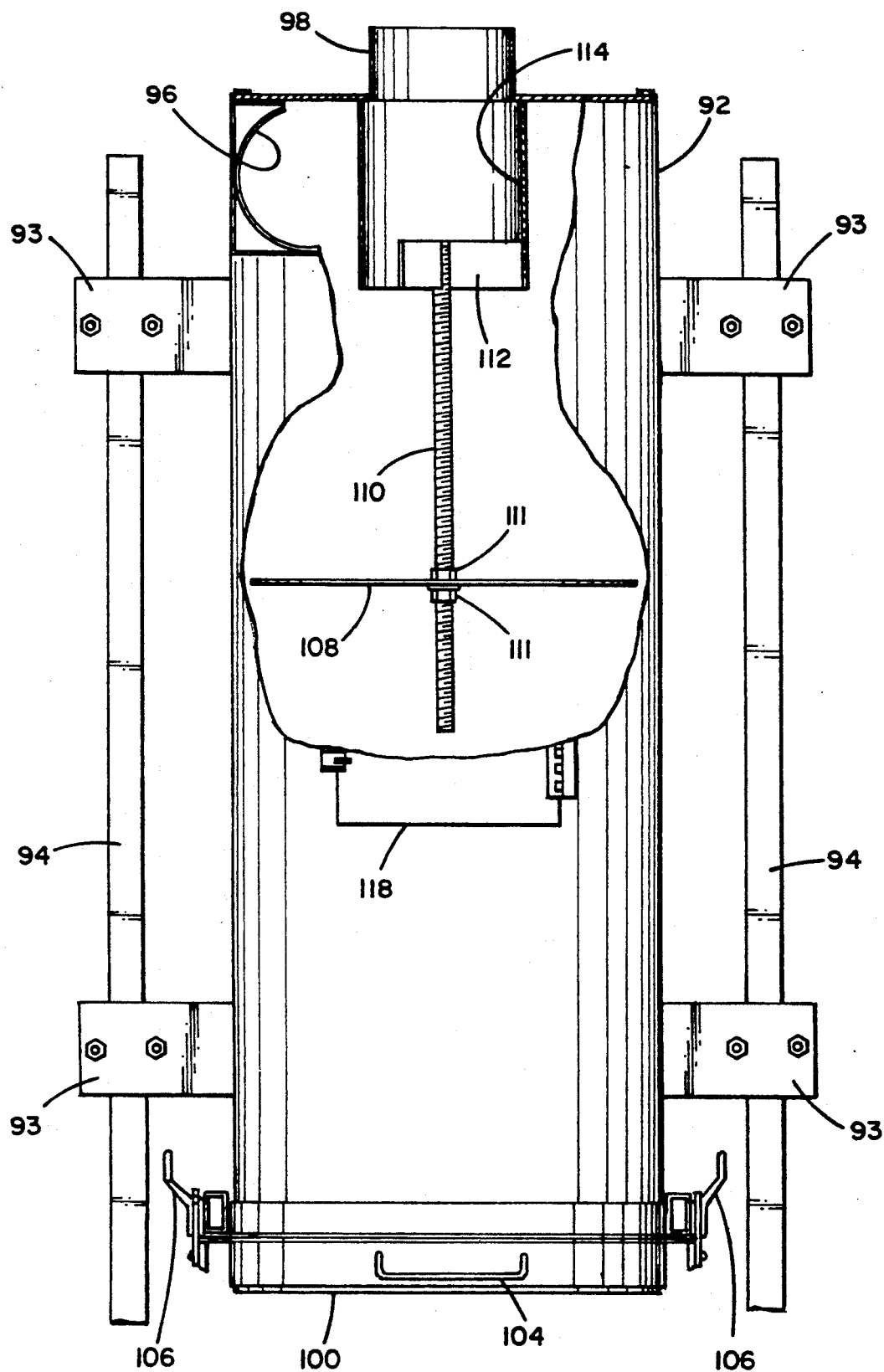

CYCLONE SEPARATOR WITH FILTER ASSEMBLY FOR PNEUMATIC CONVEYOR

CROSS-REFERENCE TO RELATED APPLICATION

This is a continuation of application Ser. No. 07/220,015, filed Jul. 15, 1988, now abandoned, which is a continuation-in-part of application Ser. No. 085,394 filed Aug. 12, 1987, now U.S. Pat. No. 4,887,936.

TECHNICAL FIELD

The present invention relates generally to pneumatic grain conveyors, and more particularly to an improved cyclone separator for a pneumatic grain conveyor incorporating an adjustable self-cleaning filter arrangement.

BACKGROUND ART

Pneumatic conveyors are widely used today for transferring grain and other types of granular material. For example, such devices can be used for transferring grain from a storage silo to a delivery truck, a laborious and time-consuming task which was otherwise accomplished by shoveling. Such pneumatic conveyors generally include a cyclone separator having a tangential material inlet and a bottom axial material outlet. The suction side of a blower is connected to an axial air inlet in the top of the separator. The high pressure side of the blower in connected to a rotary valve which is connected between the material outlet of the separator and a line leading to the point of discharge. Such devices have been mounted for mobility and adapted for use with power take-off attachments on tractors to facilitate portability and use in unloading various silos on a farm, for example.

Pneumatic grain conveyors of this general type have been available for years under the name HANDLAIR from Christianson Systems, Inc. of Blomkest, Minn., the assignee hereof. See U.S. Pat. Nos. 4,433,946 and Des. 271,105.

The pneumatic grain conveyors of the prior art have generally included some type of filter or screen arrangement between the air outlet of the separator and the inlet of the blower. These screens, of course, must be cleaned periodically, the frequency of which depends upon the particular material being handled. Some foreign particles, such as "bees wings" can clog a filter in minutes. Such screens sometimes have been located in a transparent section of the pipe between the separator and blower so that any clogging could be monitored. In addition, baffles have been located between the material and air outlets within the separator to block passage of foreign particles outward and into the blower. This has been quite effective with respect to the larger dust and foreign particles which could cause the most damage to the blower, but has not been particularly effective with respect to the lighter dust and foreign particles which also add to the wear on the blower and contribute to clogging of the filter. A more restrictive filter would capture more such particles, but also increase the pressure drop and require a larger, heavier and more expensive blower. Heretofore, there has not been available a cyclone separator incorporating a filter with a baffle plate arrangement adapted not only to block passage of the large dust and foreign particles into the air outlet, but also which effects self-cleaning of the filter so that a substantial portion of the relatively smaller particles can also be collected on a certain portion of this screen in order to delay clogging and thus interruption of operation to clear the screen.

A need has thus arisen for an improved cyclone separator incorporating an internal screen and baffle arrangement which can be adjusted in accordance with the particular material being conveyed and which reduces clogging.

SUMMARY OF THE INVENTION

The present invention comprises an improved cyclone separator which overcomes the foregoing and other difficulties associated with the prior art. In accordance with the invention, there is provided a cyclone separator for a pneumatic grain conveyor incorporating an improved internal filter and baffle arrangement. A generally cylindrical subhousing is mounted in the top end of the separator. The subhousing extends downwardly into the separator to define an air inlet therein located in spaced-apart relationship with the material outlet at the bottom of the separator. A cylindrical filter or screen is mounted in the housing between the internal air inlet thereof and an external air outlet. Seal means is provided between the cylinder and the housing so that the air flows into the filter and outward. A movable accelerator plate or baffle is mounted for adjustable positioning within the cylindrical filter so that the air is accelerated and deflected against an adjacent portion of the screen, which thus stays clean for a longer period of time and reduced clogging. If desired, a fixed baffle plate can be mounted between the in inlet and material outlet.

In accordance with the preferred construction, a second air filter assembly is connected between the in outlet of the cyclone separator and the in inlet of the blower, for further removal of dust and foreign particles. The second filter assembly also includes a circular baffle mounted on an axial shaft, not for accelerating airflow in order to effect continuous self-cleaning of a surrounding filter element, but for dividing the chamber therein so that dust particles can be collected for periodic removal without being sucked into the air outlet.

BRIEF DESCRIPTION OF DRAWINGS

A better understanding of the invention can be had by reference to the following Detailed Description in conjunction with the accompanying Drawings, wherein:

FIG. 4 is an enlarged, partially cut-away side view of the second filter assembly connected between the air outlet of the cyclone separator and the air inlet of the blower.

DETAILED DESCRIPTION

Figure 1:
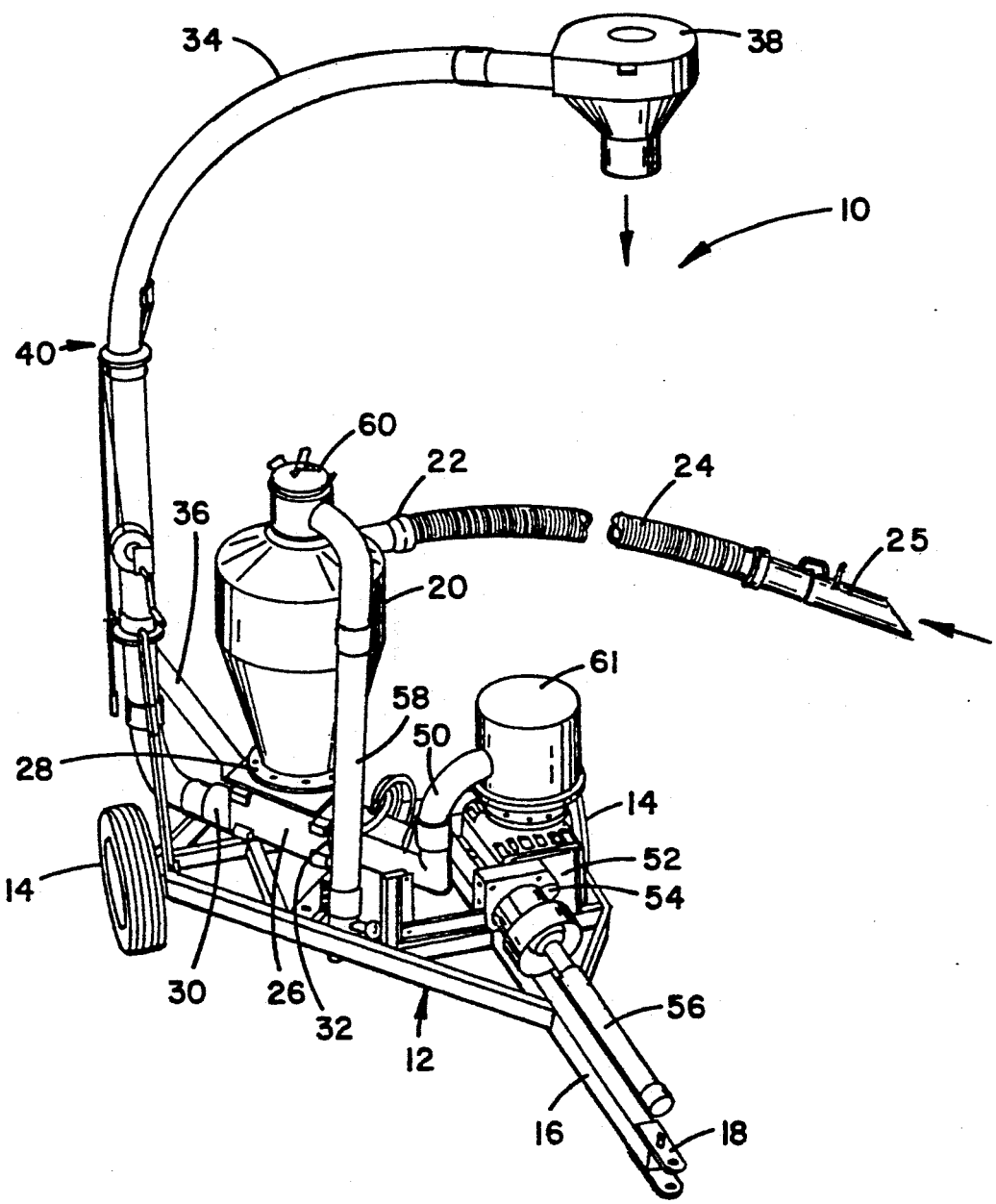
FIG. 1 is a perspective view of a pneumatic grain conveyor incorporating the filter assembly of the invention.

Referring now to the Drawings, and particularly referring to FIG. 1, there is shown a pneumatic grain conveyor 10 incorporating air cleaner of the present invention. The pneumatic grain conveyor 10 includes a frame 12 having a pair of spaced-apart wheels 14 thereon for mobility. A tongue 16 is provided on the front of frame 12, and a hitch 18 is provided on the front of the tongue for selective connection to a tractor or other suitable tow vehicle. The tongue 16 is preferably longitudinally offset from the center line of frame 12 for improved clearance when loading trucks or trailers, as will be explained more fully hereinafter.

A cyclone separator 20 is mounted on frame 12. The separator 20 includes a housing having a generally cylindrical upper side wall and a generally conical truncated lower wall as shown. An axial air outlet 21 is located in the top wall of the separator housing. A tangential grain or material inlet 22 is provided in the generally cylindrical upper wall of the housing of separator 20. A pipe or hose 24, which can be either rigid, semi rigid, or flexible is connected to the material inlet 22 and extends to a nozzle 25 for picking up the material to be conveyed. For example, the hose 24 would typically extend into a bin or silo for removing grain or the like therefrom.

A rotary air lock conveying valve 26 of the flow-through type is secured to the material outlet 28 in the conical truncated lower portion of the housing of separator 20. The valve 26 includes a material inlet coupled directly to the material outlet 28 of separator 20, a material outlet 30, and an air inlet 32. The valve 26 is typically hydraulically driven. A suitable valve is commercially available from Semco. The material outlet 30 is connected to a discharge pipe 34 which extends upwardly and is supported by an upright 36 on the rear corner of frame 12. A discharge cyclone 38 is provided on the end of pipe 34 for breaking the air lock and assuring that the grain or other material falls gently into an underlying trailer or truck (not shown).

The discharge pipe 34 is preferably of split construction to reduce clearance during transport of the pneumatic grain conveyor 10 between sites. In particular, the discharge pipe 34 includes a pivotal upper portion and a fixed lower portion interconnected by a coupling 40 like that shown in U.S. Pat. No. 4,433,946, the disclosure of which is hereby incorporated by reference. The upper portion of discharge pipe 34 folds between raised and lowered positions responsive to a crank or hydraulic cylinder arrangement.

The air inlet 32 of rotary valve 26 is connected by pipe 50 to the outlet of a blower 52, which is driven through a gear box 54 by a shaft 56 connected to the power takeoff (PTO) attachment of a tractor (not shown). For example, the RCS 409 or RCS 412 blower from Roots division of Dresser Industries, Inc. can be used for the blower 52, which typically operates at about 700-1600 CFM and 5-8 psi. The inlet of blower 52 is connected by pipe 58 to a filter assembly 60 mounted axially in the top end of separator 20.

The blower 52 is a positive displacement air pump which draws air from the separator 20 in order to lower the pressure therein, and thus effect suction on the material inlet 22 such that the grain or other material to be conveyed is drawn inwardly thus creating a vortex within the separator. The resulting centrifugal force causes the grain to move outwardly within the separator 20 as it swirls downwardly by gravity through the material outlet 28 and into valve 26, from which it is forced by the pressurized air from blower 52 through the discharge pipe 34. The swirling action within separator 20 results in separation of chaff, dust and other foreign material from the grain which is entrained in the air and carried through the filter assembly 60 and pipe 58 to blower 52 for pressurization. Although filter assembly 60 is used, it will be appreciated that air containing a fair amount of dust and foreign material enters the blower 52.

If desired, a noise suppressor or silencer 61 can be connected between valve 26 and blower 52.

Figure 2:
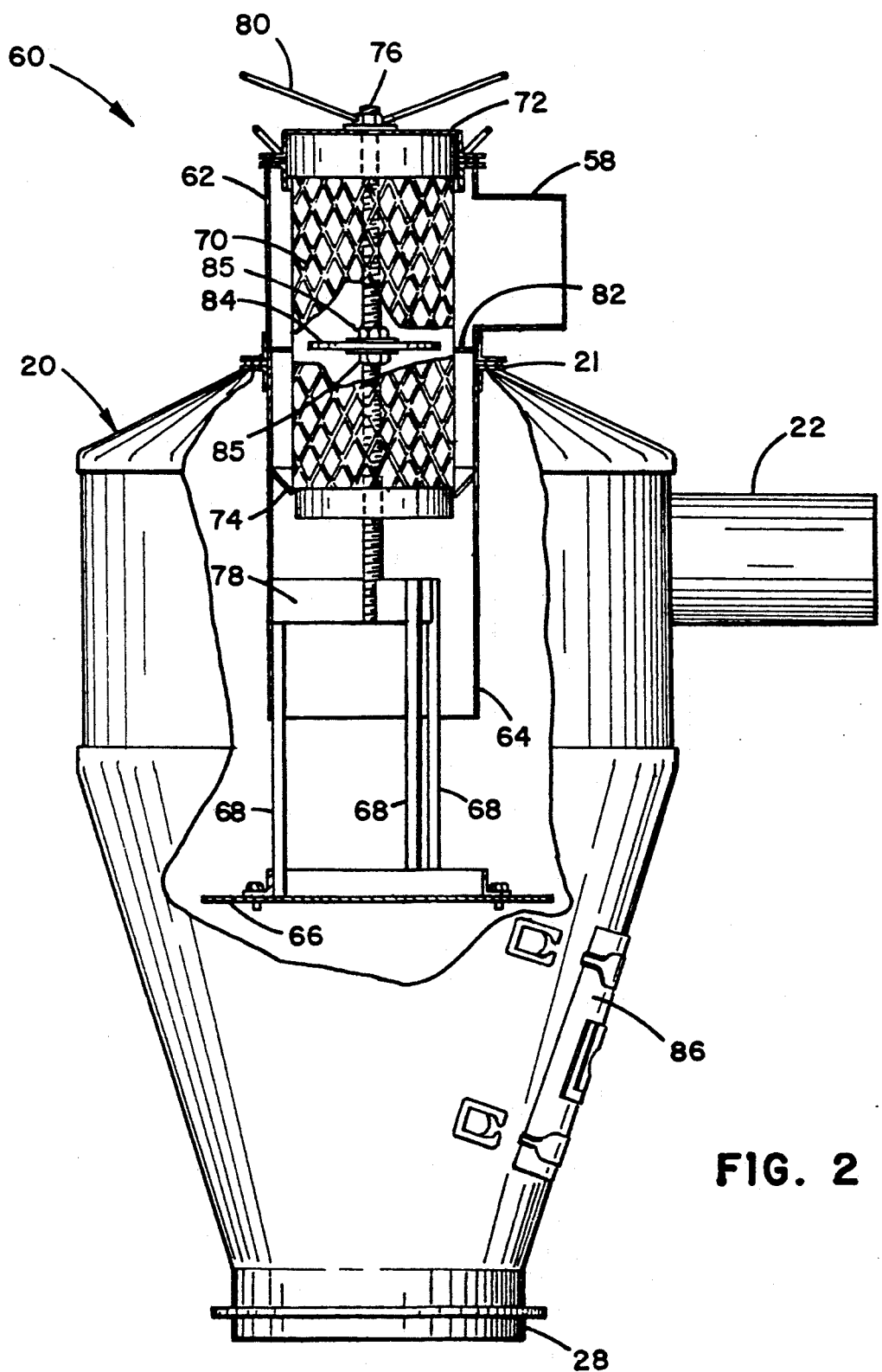
FIG. 2 is an enlarged, partially cut-away side view of the cyclone separator of the invention.

Referring now to FIG. 2 in conjunction with FIG. 1, the constructional details of the filter assembly 60 can be seen. Assembly 60 includes a case or subhousing 62 secured to the air inlet in the top end wall of separator 20. For purposes of clarity, the valve 26 secured to the material outlet 28 at the bottom end of the separator 20 has been omitted. As shown, the housing 62 extends downwardly into the separator 20 terminating at an open inlet end 64 located in spaced apart relationship with the material outlet 28.

A fixed baffle 66 is preferably positioned between the air inlet end 64 and the material outlet 28. The baffle 66 comprises a circular plate which is rigidly secured to the bottom end of housing 62 by a plurality of support rods 68. The baffle 66 is preferably circular and centered on the longitudinal axis of the separator 20, perpendicular thereto. The outer edge of baffle 66 is spaced inwardly from the generally conical truncated lower wall portion of the separator to define an open annulus through which the grain or other separated material can swirl downwardly into the outlet 28. Baffle 66 is thus positioned in the center of the vortex created as air and grain is drawn into the separator. Incoming air moves toward the center of the vortex and is drawn outwardly through housing 62, while baffle 66 functions to prevent large and medium particles of foreign matter from leaving the separator 20 and entering the blower 52.

A cylindrical filter or screen 70 is mounted in the upper end of housing 62. The screen 70 is secured between a removable cover 72 and an internal flange 74 within the housing 62. A threaded shaft 76 is also provided. The lower end of the threaded shaft 76 is secured to a spider 78, which is secured to the lower end of the housing 62 and the upper ends of the support rods 68. Shaft 76 extends upwardly through the screen 70 and a center hole (not shown) in the cover 72, which is secured in place by a handle nut 80 screwed on the top end of the shaft. A gasket 82 is also provided around the screen 70 within housing 62 and below the air outlet pipe 58 so that the flow of air through the screen is in the inside/out direction.

A movable accelerator plate or baffle 84 is provided inside the screen 70. The baffle 84, which is preferably a circular plate, is mounted for movement along the shaft 76 and is secured in position as desired by jam nuts 85. As air passes upwardly from inlet end 64 of case 62 and into screen 70, it is accelerated outwardly around baffle 84 and through the annulus defined between the baffle and the screen, the adjacent portion of which is thus kept clean. This in turn results in an adjustable distribution of material collected on the inside of the screen 70 part of which is kept clean by the self-cleaning action of the baffle 84. Positioning of the baffle 84 is adjustable in accordance with the area of the screen desired to be kept clean. When the blower 52 is turned off, waste matter collected on the inside of the screen falls downwardly and collects on the top of the fixed baffle 66 for clean out via access door 86 in the separator 20.

Although the baffle 84 has been illustrated as being of plate-like circular configuration, it will be understood that it could also be of cylindrical configuration, which in turn would result in a relatively larger area of screen 70 being impinged and kept clean. Further, more than one baffle 84, of either circular or cylindrical configuration, could be used, if desired, with or without the fixed lower baffle 66.

Figure 3:
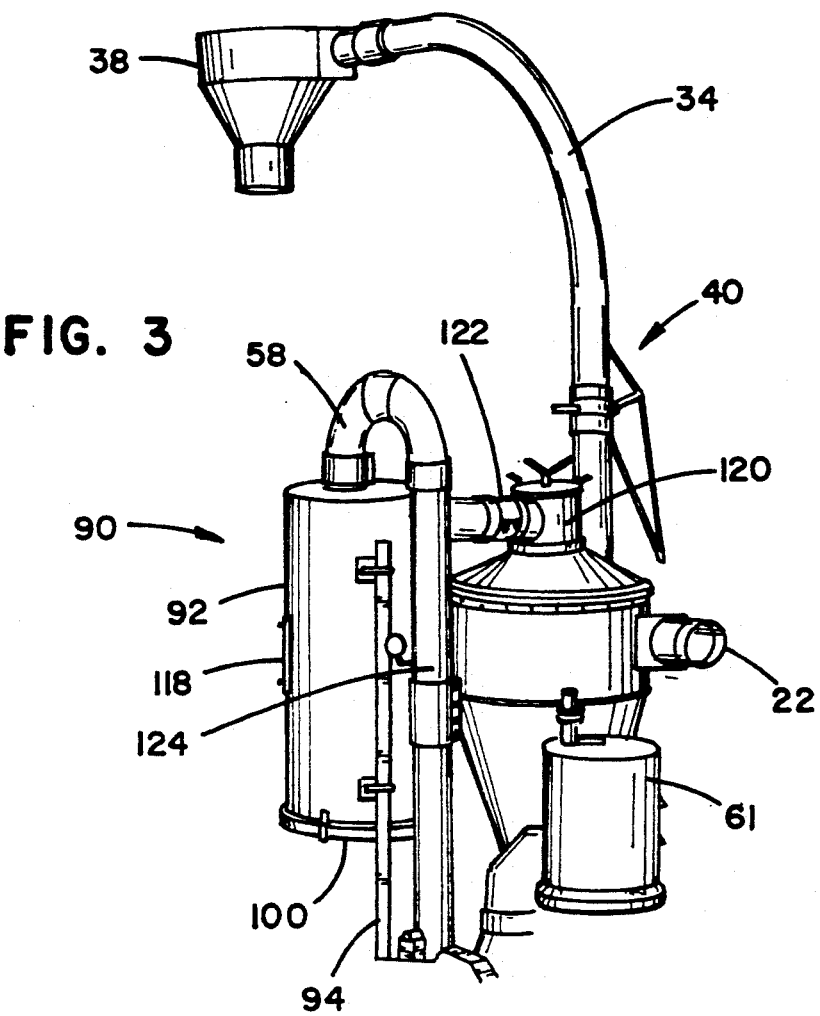
FIG. 3 is a partial view of a pneumatic grain conveyor having the second filter assembly of the invention.
Figure 5:
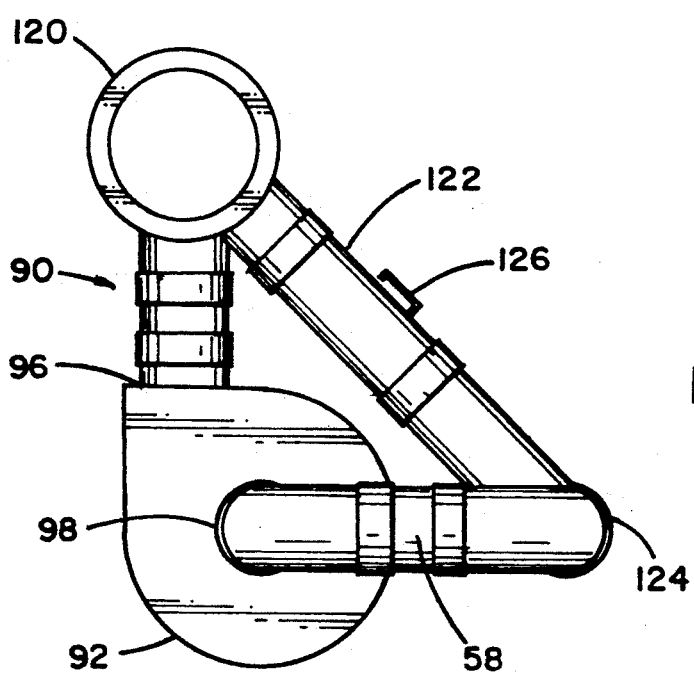
FIG. 5 is a partial top view showing the diverter arrangement.

Referring now to FIGS. 3–5, there is shown a second filter assembly 90 which can be used with the pneumatic grain conveyor 10 herein. The second filter assembly 90 can be used alone or in conjunction with the first filter assembly 60 and the cyclone separator 20, although in the preferred embodiment both filter assemblies are desirable for maximum performance. As described above, the first filter assembly 60 is primarily adapted to remove large and medium particles of dust and foreign particles from air leaving the separator 20 and entering the blower 52. The second filter assembly 90, which is connected between the separator 20 and blower 52, is adapted for further removal of medium and small particles of foreign matter in order to achieve even better performance. However, the second filter assembly 90 does not incorporate any filter elements therein and is adapted for convenient removal of dust and foreign matter collected therein in order to further minimize downtime from interruptions during operation of the pneumatic conveyor 10 for cleaning, etc.

The second filter assembly 90 includes a generally cylindrical case or subhousing 92. Opposing pairs of lugs 93 are provided on the case 92 for mounting on a pair of uprights 94, which are secured at their lower ends to the frame 12 of the pneumatic conveyor 10.

A tangential air inlet 96 and an axial air outlet 98 are provided at the upper end of case 92. A hinged door 100 is provided at the lower end of the case 94. The door 100 is mounted on a hinge (not shown) for swinging movement between an up and closed position and a down and open position. The door 100 includes a handle 104. Latches 106 are provided about the lower end of the case 92 for selectively securing the door in the normally closed position. A sealing gasket (not shown) is preferably provided between the door 100 and the material outlet 106 defined by the lower end of case 92.

A baffle plate 108 is positioned within the case 92 between the air outlet 98 and the material outlet 106. As is best seen in FIG. 4, the baffle plate 108 comprises a circular plate with a central hole therein mounted along a threaded shaft 110 extending along the axis of case 92. The baffle plate 108 is secured in place by shaft 110 by jam nots 111. The upper end of shaft 110 is secured to a spider 112, which in turn is secured within a cylindrical collar or extension 114. The extension 114 is secured at its upper end to the inside top end of case 92 about the air outlet 98. The extension 114 can thus be considered an extension of the air outlet 98 extending into the case 92. It will be noted that the open lower end of extension 114 extends downwardly within the case 92 to a level below that of the tangential air inlet 96 so that the air and any dust or foreign particles therein which enter the filter assembly 90 must swirl about the inside surface of the case 92 before turning and entering the extension 114 for exit through the air outlet 98.

Rather than functioning as an accelerator plate as in the first filter assembly 60, the plate 108 of the second filter assembly 90 serves as an annular divider between the upper and lower portions of the chamber within case 92. For example, the outside diameter of plate 108, can be about 16 ½ to 17 inches and the inside diameter of case 92 can be about 18 inches. As the air entering inlet 96 swirls within the upper end of the chamber, the dust and foreign particles therein are driven outwardly against the wall by centrifugal action and pass through the annulus defined about plate 108 for collection in the lower end of the chamber. As the air then turns for exit from the axial air outlet 98, plate 108 functions to prevent any dust or foreign particles collected in the lower end of case 92 from being sucked out therewith. Dust and dirt collected within case 92 can later be removed via door 100. An access door 118 with a window (not shown) therein is preferably provided in the side of case 92 for checking the amount of dust and foreign material collected therein.

If desired, the second filter assembly 90 can be provided with a bypass arrangement comprising a bonnet 120 defining one inlet and two outlets. The inlet of bonnet 122 is connected to the outlet 58 of separator 20. One outlet of bonnet 122 is connected to the inlet 96 of case 92, while the other outlet is connected through a butterfly valve 122 to a tee 124 in pipe 58. Valve 124 is controlled by handle 126. The second filter assembly 90 can thus be selectively connected or disconnected for bypass as desired depending upon the type of grain being handled and the need for additional filtration.

From the foregoing, it will thus be apparent that the present invention comprises an improved cyclone separator for a pneumatic grain conveyor having several advantages over the prior art. One advantage involves the fact that the filter is located within an extension of the separator, instead of in a restricted connecting line, resulting in less pressure drop or no greater pressure drop with a finer mesh screen. The adjustable baffle either with or without the lower fixed baffle, keeps at least a portion of the screen clean which in turn results in a heavier build up of waste and foreign particles in the other portions of the screen than in turn fall away more readily under gravity when the blower is turned off. Other advantages will be evident to those skilled in the art.

Although particular embodiments of the invention have the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A pneumatic grain conveyor, comprising:
   a frame;
   a cyclone separator mounted on said frame, said separator including a closed housing with a generally cylindrical upper side wall with a tangential material inlet and an air outlet in a top end wall, and a generally conical truncated lower side wall with a material outlet at a bottom end thereof;
   a first filter assembly mounted in said air outlet of said separator, said first filter assembly comprising:
     a generally cylindrical subhousing extending axially into the top end wall of the housing of said cyclone separator, said subhousing having an external top end and an internal bottom end;
     a generally cylindrical screen with top and bottom ends disposed within said subhousing;
     a first transverse baffle plate mounted inside said screen between the ends thereof, said first baffle plate defining a predetermined open annulus with said screen;

means for adjustably positioning said first baffle plate longitudinally within said screen;

means defining a radial air outlet adjacent said screen in the top end of said subhousing;

a second transverse baffle plate mounted between the bottom end of said subhousing and the material outlet of said cyclone separator;

a rotary valve including a material inlet connected to the material outlet of said cyclone separator, a material outlet, and an air inlet;

a blower including an air inlet connected to the air outlet in the top end wall of said cyclone separator, and an air outlet connected to the air inlet of said rotary valve means;

a second filter assembly connected between the air outlet of said separator and the air inlet of said blower; and means for driving said blower.

2. A pneumatic grain conveyor, comprising:

a frame;

a cyclone separator mounted on said frame, said separator including a closed housing with a top end wall with an air outlet therein, a generally cylindrical upper side wall with a tangential material inlet therein, and a generally conical truncated lower side wall with a material outlet at a bottom end thereof;

a filter assembly comprising:
a filter means for collecting particulate material from an air stream, said filter means further comprising a generally cylindrical filter element mounted in the air outlet of said cyclone separator whereby the particulates are collected on an inner surface of said element, and means for selectively cleaning the collected particulates from said filter element while said pneumatic conveyor is in operation wherein said cleaning means comprises means for directing an accelerated airflow against selected portions of said inner surface of said element;

means for removably mounting said filter assembly in the air outlet of said cyclone separator;

a rotary valve including a material inlet connected to the material outlet of said cyclone separator, a material outlet, and an air inlet;

a blower including an air inlet connected to the air outlet in said cyclone separator, and an air outlet connected to the air inlet of said rotary valve; and means for driving said blower.

3. A pneumatic grain conveyor, comprising:

a frame;

a cyclone separator mounted on said frame, said separator including a closed housing with a top end wall with an air outlet therein, a generally cylindrical upper side wall with a tangential material inlet therein, and a generally conical truncated lower side wall with a material outlet at a bottom end thereof;

a filter assembly comprising:
a filter means comprising a generally cylindrical filter element mounted in the air outlet of said cyclone separator for collecting particulate material from an air stream on an inner surface of said element, a baffle plate adjustably mounted along a central longitudinal axis of said filter element within said filter element and defining an annular opening between said plate and said inner surface of said element whereby an accelerated air flow is directed against selected portions of said inner surface to selectively clean the collected particulates while the pneumatic conveyor is in operation;

means for removably mounting said filter assembly in the air outlet of said cyclone separator;

a rotary valve including a material inlet connected to the material outlet of said cyclone separator, a material outlet, and an air inlet;

a blower including an air inlet connected to the air outlet in said cyclone separator, and an air outlet connected to the air inlet of said rotary valve; and means for driving said blower.

* * * * *